United States Patent Office 3,405,592
Patented Oct. 15, 1968

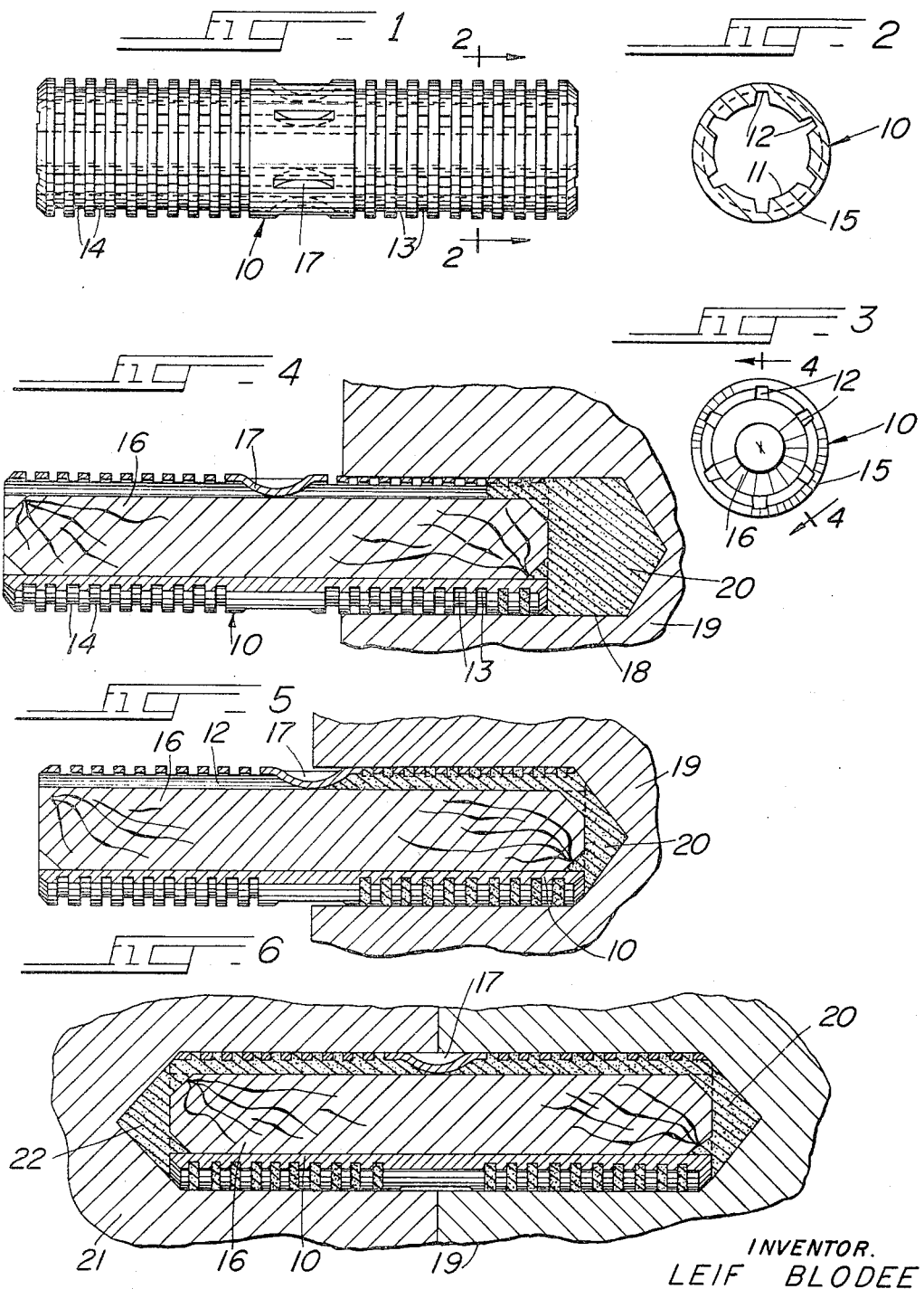

3,405,592
DOWEL STRUCTURE
Leif Blodee, 19 Circle Drive, Poland, Ohio 44514
Filed Dec. 12, 1966, Ser. No. 600,927
9 Claims. (Cl. 85—14)

ABSTRACT OF THE DISCLOSURE

A tubular dowel provided with internal axial channels and peripheral openings communicating therewith, and a plug occupying the central opening of the tubular dowel, but leaving the channels unobstructed from the opposite ends to a position adjacent the center thereof for the flow of adhesive.

---

This invention relates to the construction of dowels used in conjunction with liquid adhesive to join two members together. Dowel joints are very common in the manufacture of furniture, and the present invention provides a sufficient increase in the security of the joint to allow the use of thinner sections in the joined members. This amounts to an increase in the designer's freedom to incorporate graceful and slender configurations without endangering the structural integrity of the piece.

The installation of a dowel embodying the present invention generates a sufficient degree of hydraulic pressure to drive the liquid adhesive firmly out into engagement with the wall of the hole in which the dowel is received. This results in an increase in the penetration of the adhesive into a porous material such as wood, and in the formation of ridges or projections which interlock between the dowel and the surrounding material when the adhesive hardens. The configuration of the dowel is such that it functions in the manner of a piston as it is driven into the opposite holes in the members being joined. A quantity of liquid adhesive is placed in the holes prior to engagement of the dowel, and the piston action forces the liquid adhesive into a uniformly distributed engagement with both the dowel and the surrounding member. The piston function of the dowel is obtained by the use of a tubular outer member (preferably of metal) with axial channels formed on its inside surface. The inside opening (excepting the channels) is occupied by a plug, which produces passages along the inside of the tubular outer member. These communicate with preferably annular grooves on the exterior of the outer member through peripheral openings, thus providing a path for the flow of a deposit of adhesive (previously inserted in the dowel hole) as the dowel assembly is driven home. The several features of the invention will be analyzed in detail through a discussion of the preferred embodiment illustrated in the accompanying drawing. In the drawing:

FIGURE 1 is a side elevation of a dowel shell, prior to the installation of the central plug.

FIGURE 2 is a section on the plane 2—2 of FIGURE 1.

FIGURE 3 illustrates the completely assembled dowel, after the plug has been inserted in the shell shown in FIGURES 1 and 2.

FIGURE 4 is an axial section through the dowel illustrated in FIGURE 3 (shown on the plane 4—4), with FIGURE 4 illustrating the dowel in the partially-installed condition.

FIGURE 5 is a view similar to FIGURE 4, but showing the dowel driven to the fully installed position in one of the members being jointed.

FIGURE 6 illustrates the fully installed position, with the dowel structure engaging both of the joined members.

The dowel structure illustrated in the drawings includes the outer shell generally indicated at 10, which is provided with an axial bore 11. A group of axial grooves 12 interrupts the bore 11, and preferably extends throughout the entire axial length of the device. A series of annular grooves 13 is formed in one end of the shell, and a similar group 14 at the other. These grooves are of such a depth as to provide communication between the annular groves 13-14 and the axial grooves 12. It is preferable that the shell 10, including the cylindrical periphery 15, the bore 11 and the axial grooves 12 be constructed of extruded aluminum. Pieces corresponding to the length of the shell 10 may then be cut off, after the annular grooves 13 and 14 have been cut into the peripheral surface 15 by a lathe operation utilizing a form tool.

A central plug 16 may be assembled to the shell 10 prior to installation of the dowel into the joined members, with the plug assuming the position with respect to the shell shown in FIGURES 4, 5, and 6. It is preferable that the plug 16 occupy the entire diameter of the bore 11, exclusive of the axial grooves 12. When the plug is installed, a group of axial passages is then defined by the grooves 12 and the periphery of the plug 16. These passages are blocked in the central area of the dowel structure by the portions 17, which are lanced into a position such that the entire cross section of the grooves 12 are fully occupied. These lanced portions 17 are preferably of sufficient depth to bear fairly strongly against the periphery of the plug 16 to provide an axial restraint on the plug to hold it in the assembled position.

The dowel structure thus assembled may be inserted in the hole 18 in the member 19, a quantity of liquid adhesive shown at 20 having previously been deposited in the position shown in FIGURE 4. Driving the dowel structure to the right, as shown in FIGURE 4, results in forcing the adhesive through the channels defined by the grooves 12, and outward into the spaces defined by the annular grooves 13 in conjunction with the wall of the hole 18. Sufficient pressure can be generated in the liquid adhesive to assure a full engagement with the dowel structure and the wall of the hole 18. This procedure is repeated with the opposite member 21, with the result that the members 19 and 21 are firmly joined together after the adhesive 20 and 22 has set. Even though the adhesive may not firmly adhere to the metal of the shell 10, the ridges formed by the engagement of the adhesive with the grooves 13 and 14 will provide a very solid reliable joint. It is also very significant that the installation of this dowel structure results in removal of air from the hole 18 which is normally entrapped ahead of a solid dowel as it is inserted. The entrained air is easily exhausted through the passages defined by the grooves 12 before they are occupied by the liquid adhesive. The nature of the adhesive may be selected according to whether a purely adhesive, or a combined adhesive-mechanical bond is desired with the dowel structure. Under conditions which the shear strength of the dowel is of substantial importance, it is possible to use a metal plug in place of the wooden plug 16.

The particular embodiments of the present invention which have been illustrated and discussed herein are for illustrative purposes only and are not to be considered as a limitation upon the scope of the appended claims. In these claims, it is my intent to claim the entire invention disclosed herein, except as I am limited by the prior art.

I claim:

1. In combination with a charge of liquid adhesive deposited in a dowel hole in a workpiece, a dowel structure, comprising:

an enlongated shell having an axial bore provided with at least one axial groove;
a plurality of spaced openings on the periphery of said shell communicating with said axial groove radially through said shell; and
a plug extending in said bore exclusive of said groove.

2. A dowel structure as defined in claim 1, wherein said shell has a plurality of axial grooves in said bore.

3. A dowel structure as defined in claim 1, wherein said periphery is cylindrical, and is provided with annular grooves communicating with said axial groove.

4. A dowel structure as defined in claim 1, wherein said plug occupies substantially all of said bore exclusive of said groove.

5. A dowel structure as defined in claim 4, wherein said shell has a central portion engaging said axial groove to block the same.

6. A dowel structure as defined in claim 1, wherein said plug is axially secured with respect to said shell.

7. A dowel structure, comprising:
an elongated shell having symmetrical end portions, and having an axial bore throughout its length provided with at least one axial groove throughout substantially the entire length of said bore, said shell also having a plurality of annular grooves on a cylindrical periphery of said shell at each end thereof communicating with said axial groove; and an elongated plug frictionally engaged in said bore exclusive of said axial groove.

8. A dowel structure as defined in claim 3, wherein said shell has a plurality of axial grooves in said bore.

9. A dowel structure as defined in claim 3, wherein said plug occupies substantially all of said bore exclusive of said groove.

References Cited

UNITED STATES PATENTS

| | | |
|---|---|---|
| 981,385 | 1/1911 | Cooper. |
| 1,596,706 | 8/1926 | Bartels. |
| 2,150,080 | 3/1939 | Rawlings _____ 85—83 |

FOREIGN PATENTS

| | | |
|---|---|---|
| 33,206 | 1946 | Poland. |
| 153,730 | 3/1956 | Sweden. |

CARL W. TOMLIN, *Primary Examiner.*

R. S. BRITTS, *Assistant Examiner.*